United States Patent
Ferrachat et al.

(10) Patent No.: US 7,722,788 B2
(45) Date of Patent: May 25, 2010

(54) MOLD INSERTS

(75) Inventors: Marie-Paule Ferrachat, Saint Maur des Fosses (FR); Fabienne Hanriot, Paris (FR); Alain Massee, Longeaux (FR); Alain Coulon, Montauban (FR)

(73) Assignee: Essilor International, Charenton Cedex (FR)

( * ) Notice: Subject to any disclaimer, the term of this patent is extended or adjusted under 35 U.S.C. 154(b) by 476 days.

(21) Appl. No.: 10/477,639

(22) PCT Filed: May 17, 2002

(86) PCT No.: PCT/FR02/01677

§ 371 (c)(1),
(2), (4) Date: Nov. 13, 2003

(87) PCT Pub. No.: WO02/096613

PCT Pub. Date: Dec. 5, 2002

(65) Prior Publication Data

US 2004/0169313 A1    Sep. 2, 2004

(30) Foreign Application Priority Data

May 31, 2001   (FR)   ................... 01 07168

(51) Int. Cl.
*B29D 11/00* (2006.01)
*B29C 33/56* (2006.01)

(52) U.S. Cl. .................... 264/2.5; 249/114.1; 264/219; 425/808; 427/133; 427/162

(58) Field of Classification Search ............... 264/1.1, 264/2.5, 1.7, 2.9, 219; 425/808; 249/114, 249/115, 134, 135, 114.1; 427/133, 135, 427/585, 162, 166
See application file for complete search history.

(56) References Cited

U.S. PATENT DOCUMENTS

| | | | | |
|---|---|---|---|---|
| 4,882,827 | A | 11/1989 | Kusumi et al. | ............. 29/527.2 |
| 4,948,627 | A | 8/1990 | Hata et al. | ................... 427/38 |
| 5,112,025 | A | 5/1992 | Nakayama et al. | .......... 249/115 |
| 5,641,437 | A * | 6/1997 | Williams et al. | ............. 264/2.5 |
| 5,662,999 | A | 9/1997 | Taniguchi et al. | ........... 428/408 |
| 5,872,613 | A | 2/1999 | Blum et al. | ................. 351/177 |

FOREIGN PATENT DOCUMENTS

| | | |
|---|---|---|
| JP | 2000-000828 | 1/2000 |
| JP | 2000-228037 | 8/2000 |
| JP | 2001-312844 | 11/2001 |

* cited by examiner

*Primary Examiner*—Mathieu D. Vargot
(74) *Attorney, Agent, or Firm*—Hensley Kim & Holzer, LLC

(57) ABSTRACT

The invention relates to a mold insert, the interior surface thereof having an average quadratic roughness of less than 10 nm. Said insert is covered with a protective layer exhibiting a Vickers hardness of more than 1000 HV, a thickness of between 0.2 and 5 μm, and an adhesive strength greater than 15 N. The invention also relates to a method for the production thereof. The invention is used for the production of ophthalmic lenses.

14 Claims, No Drawings

MOLD INSERTS

The present invention relates to molding inserts and to their manufacturing process. It also relates to devices for molding optical components comprising such molding inserts, in particular for injection molding ophthalmic lenses made of polycarbonate.

The lenses are molded by injecting the material into a cavity which is formed especially by two inserts having the shape of the front surface and the rear surface of the lens to be molded, respectively.

These inserts are generally made of metal, but may also be made of glass. The manufacturing process using injection molding subjects these inserts to very high mechanical and thermal stresses. However, the inserts must be able to undergo a large number of cycles in order to ensure profitability of the process. Moreover, these inserts must be able to be easily cleaned, be chemically inert and be resistant to attack when being handled without becoming scratched. Production of these inserts is therefore tricky because of the number of constraints to be taken into account.

With regard to the manufacture of aspherical unifocal lenses, it is well known to produce the inserts in the following manner: firstly, the metal block, generally made of steel, is machined to the desired shape by means of a numerical control machine. Once machined, the surface is polished. This surface is then coated with a chromium coating so as to increase the abrasion resistance of the insert and therefore its lifetime. The coating deposited has a thickness of between 40 and 60 µm. Since the chromium coating is not very uniform, the external surface of the chromium coating no longer corresponds precisely to the shape of the machined surface. It is therefore necessary to polish the external face of this coating so as to obtain the desired shape again. Although this process is well-controlled, it nevertheless remains very expensive.

For inserts with a progressive surface, the process is even more complex as certain progressive surfaces require two-step machining: in a first step, the surface is machined and checked by means of a specific apparatus for measuring progressive surfaces. A second step allows the observed defects to be corrected. A chromium coating is then deposited, this then being polished, while still respecting the geometrical characteristics of the surface. This process, which includes a repolishing step, is very lengthy and expensive.

To control, or better still reduce, the cost of producing these lenses, it is important to reduce the cost of manufacturing the inserts on the one hand and increase their lifetime in terms of the number of cycles on the other hand.

Certain solutions aiming to simplify this insert manufacturing process have been proposed. For this purpose, it has been proposed to deposit carbon coatings with a uniform thickness so as to obviate the repolishing step.

Thus, patent U.S. Pat. No. 4,948,627 discloses the manufacture of SiC molds for the hot-compression molding of precision optical elements made of glass. The mold is coated with a carbon coating intended to facilitate demolding and comprising diamond and graphite crystallites as well as amorphous carbon. The coating has a thickness of at most 1 µm and a maximum roughness of less than 20 µm. The coating is deposited by thermal or plasma-enhanced chemical vapor deposition (CVD). The gas phase comprises, apart from hydrogen, at least 3 mol % of an organic gas. However, the films containing graphite or hydrogen have a poor temperature resistance. This is because their hardness and their adhesion to the mold decrease considerably after exposure to a high temperature.

Patent U.S. Pat. No. 4,882,827 discloses SiC molds coated with a more temperature-resistant "hard" carbon coating. The "hard" carbon may comprise diamond and graphite phases. The "hard" carbon coating is deposited by sputtering in the presence of an inert gas such as argon at a temperature of between 250 and 450° C. The thickness of the layer is from 0.5 to 20 nm. The patent indicates that the coatings deposited by CVD lead to poor results. This type of process has the drawback of requiring the prior deposition of a β-SiC coating deposited by CVD so as to fill the pores of the mold and improve the surface finish. This coating has a thickness of greater than 5 µm, typically 500 µm. The complexity of the process, a coating of such a thickness no longer makes it possible to comply with the geometrical characteristics of the surface of the mold for precision optical components.

Moreover, it turns out that such carbon coatings adhere poorly to metal inserts. To improve the adhesion, it has therefore been proposed to deposit an intermediate coating.

Thus, patent U.S. Pat. No. 5,872,613 discloses the production of a DLC (diamond-like carbon) coating on a metal mold. The DLC is characterized by a Raman spectroscopy absorption peak at 1550 cm$^{-1}$. The DLC coating has a thickness of between 0.1 and 100 µm, preferably between 1 and 50 µm. To improve the adhesion of the DLC coating to the metal mold, a molybdenum coating is interposed between the mold and the DLC coating. The deposition is carried out by ion evaporation at a temperature below 600° C. in the presence of a bombardment gas. This type of process requires the deposition of two coatings of different type, which slows down the manufacture. In addition, the process involves two different deposition techniques, which makes it expensive and tedious.

Patent U.S. Pat. No. 5,112,025 discloses the coating of nickel-plated molds for the manufacture of compact discs. The surface of these compact discs is plane and has patterns. The insert used to produce such discs is in general covered with nickel, facilitating the tracing of patterns. Repeated injection molding of compact discs wear away and flatten the patterns, resulting in a loss of geometric characteristics. Moreover, the injected material may remain blocked in the patterns and cause difficulties in demolding. The document therefore proposes to deposit a DLC protective coating on the nickel so as to facilitate demolding. However, there is a risk that the durability of this type of "hard" coating deposited on a soft substrate, such as nickel, may not be suitable for the process of molding optical components, the inserts being exposed to considerable assault during handling operations, which is not the case with compact disc molding devices.

The problem that arises is then that of providing a device for molding optical components that does not have the drawbacks mentioned and especially has an improved lifetime and does not require repolishing.

According to the invention, this problem is solved by means of a molding insert whose internal surface has a mean square roughness Rs of less than 10 nm, which insert is coated with a protective coating having a Vickers hardness of greater than 1000 HV, a thickness of between 0.2 and 5 µm, the critical adhesion force of which is greater than 15 N.

Preferably, the protective coating is made of DLC.

According to one embodiment, the insert bearing the protective coating is made of steel or glass.

In particular, the insert may bear markings.

Preferably, the thickness of the protective coating is between 2 and 5 µm.

Advantageously, the insert coated with the protective coating has an average surface roughness of less than 7 nm. According to a preferred embodiment, the protective coating has a Vickers hardness of greater than 1500 HV.

The subject of the invention is also a device for molding an optical component that includes such an insert.

The subject of the invention is also the use of such a device for manufacturing ophthalmic lenses by injection molding. According to one embodiment, the ophthalmic lens is a progressive lens. According to another embodiment, the molded ophthalmic lens is made of polycarbonate.

Finally, the subject of the invention is a process for manufacturing a molding insert, comprising the steps of
- machining and polishing of an insert until an $R_{ms}$ of less than 10 nm is obtained;
- deposition of a protective coating having a Vickers hardness of greater than 1000 HV, a thickness of between 0.2 and 5 µm and the critical adhesion force of which is greater than 15 N, preferably by CVD.

The Applicant has in fact found that it is possible to deposit a protective coating, for example made of DLC, directly on the surface of complex surfaces with sufficient adhesion to withstand the injection molding pressures if the substrate has a normalized roughness parameter $R_{ms}$ (mean square roughness) of less than 10, preferably 7 nm and a thickness of between 0.2 and 5 µm. An upper thickness of 2 µm of the DLC coating also contributes to improving its abrasion resistance properties. It is then possible to obtain such a protective coating with a very uniform thickness, thereby making it possible to maintain the geometrical characteristics of the surface of the mold and even eliminating the tricky repolishing step.

The surface thus coated of an insert is more resistant to attack, and this makes it possible for its lifetime to be considerably increased. The process for manufacturing such devices is less expensive since it requires neither deposition of an intermediate coating nor repolishing of the protective coating.

Furthermore, it has been observed that, unlike the inserts obtained by electrodeposition of chromium, the markings that certain inserts bear remain visible after the protective coating has been deposited. This fact makes it easier to use these inserts having markings, especially those intended for the manufacture of progressive ophthalmic lenses.

The invention will now be described more specifically below by means of a preferred embodiment.

A steel insert is machined and then polished. The surface finish preferably has an $R_{ms}$ of less than 10 nm and particularly less than 7 nm.

A protective coating is deposited directly on this surface. Preferably, this is a diamond-like carbon coating. The diamond-like carbon may be an a-DLC (amorphous diamond-like carbon), but also an Me-DLC (metal diamond-like carbon), such as WC-C, that is to say DLC in which metal components such as tungsten have been added). It may also be envisioned to deposit TiN or TiCN.

The deposition is advantageously carried out by PACVD (plasma-assisted chemical vapor deposition). However, deposition by CVD or PVD is also possible.

The surface finish of the substrate, and therefore of the insert, is particularly important for obtaining good adhesion of the protective coating and guarantees its optical quality. Preferably, the surface of the insert has an average roughness of less than 10 nm, particularly less than 7 nm.

Thickness uniformity ensures that the geometrical characteristics of the insert are met without requiring repolishing. Preferably, the coating has a thickness of between 0.2 and 5 µm. When the thickness is less than 0.2 µm, it no longer provides sufficient abrasion resistance. When the thickness is greater than 2 µm, improved adhesion is observed. When the thickness of the coating is greater than 5 µm, there is a risk of the geometrical characteristics of the surface and the markings no longer being met. The coating thus deposited has a thickness uniformity such that it does not need to be polished, which makes it possible to eliminate an expensive and deforming step. Furthermore, since the thickness deposited is small enough, the geometrical characteristics of the surface are indeed met. Measurements performed by means of a three-dimensional measuring machine have shown that the thickness variation of the coating thus deposited is of the order of 0.1 µm, which is very small and suitable for manufacturing ophthalmic lenses.

This manufacturing process makes it possible to obtain high-quality inserts, which in turn determines the quality of the lenses obtained by injection molding. This process, no longer requiring a polishing step, makes it possible to lower the production cost of the inserts. Finally, by increasing the lifetime of these inserts, such a process also makes it possible to lower the production cost of the ophthalmic lenses obtained.

The coatings thus deposited have the following physicochemical characteristics. The Vickers hardness of the protective coating is greater than 1000 HV and preferably greater than 1200 HV.

Preferably, the materials used ensure that there is a low coefficient of friction with the molding materials. Thus, a DLC protective coating has proven to be compatible with the injection molding of polycarbonate. The protective coating is also preferably chemically inert.

The surface finish after deposition is also preferably characterized by a low roughness, for example characterized by a mean square surface roughness $R_{ms}$<10 nm. In general, isolated defects of the crater or scratch type are not observed. Under these conditions, the coatings exhibit good adhesion behavior. Typically, the critical force of adhesion of the protective coating is greater than 15 N. The critical force $L_c$ is the force expressed in newtons on the basis of which, in a scratch-type test with an imposed increasing normal force, there is no adhesion of the coating along the scratch. The test consists in moving a specimen beneath a diamond tip (200 micron radius Rockwell indentor, MST apparatus from CSEM). When the force applied to the diamond tip is increased, the latter sinks progressively into the coating and produces a scratch of increasing depth. The value of the force at which separation of the coating from its substrate is observed is called the critical adhesion force.

The value chosen for the thickness of the protective coating solves the problem that the markings present on the inserts pose. This is because progressive ophthalmic lenses necessarily bear markings which are produced in negative form on the inserts, for example by laser etching. Each marking has a depth of about 0.9 µm and a width of about 100 µm. These markings may therefore be deposited on the insert, before deposition of the protective coating, with the assurance that they will be preserved.

The invention claimed is:

1. A device for molding an ophthalmic lens, the device comprising a molding insert which bears markings configured for transfer to the ophthalmic lens, wherein an internal surface of the insert has a mean square roughness $R_{ms}$ of less than 10 nm, and wherein the internal surface of the insert is coated with a protective coating having a Vickers hardness of greater than 1000 HV, a thickness of between 2 and 5 µm and a critical adhesion which is greater than 15 N.

2. The device as claimed in claim 1, in which the protective coating is made of DLC.

3. The device as claimed in claim 1, in which the insert bearing the protective coating is made of steel or glass.

4. The device as claimed in claim 1, in which the insert coated with the protective coating has an average surface roughness of less than 7 nm.

5. The device as claimed in claim 1, in which the protective coating has a Vickers hardness of greater than 1500 HV.

6. A process for manufacturing an ophthalmic lens molding insert, comprising:
- machining and polishing an internal surface of the insert until a mean square roughness $R_{ms}$ of less than 10 nm is obtained; and
- depositing a protective coating on the internal surface such that markings on the insert for transfer to the ophthalmic lens remain visible after the protective coating is deposited, the protective coating having a Vickers hardness of greater than 1000 HV, a thickness of between 2 and 5 μm and a critical adhesion of greater than 15 N.

7. The process as claimed in claim 6, in which the protective coating is deposited by CVD.

8. The device as claimed in claim 1, wherein the device is configured to manufacture ophthalmic lenses by injection molding.

9. The device as claimed in claim 8, in which the ophthalmic lens is a progressive lens.

10. The device as claimed in claim 9, in which the ophthalmic lens is made of polycarbonate.

11. The device as claimed in claim 2, in which the insert bearing the protective coating is made of steel or glass.

12. The device as claimed in claim 1, wherein the markings remain visible after the protective coating is applied to the internal surface of the insert.

13. The device as claimed in claim 1, wherein the internal surface of the insert is a progressive surface.

14. The process as claimed in claim 6, wherein the internal surface of the insert is a progressive surface.

* * * * *